United States Patent [19]

Weiler et al.

[11] Patent Number: 5,400,882
[45] Date of Patent: Mar. 28, 1995

[54] DUO-SERVO DRUM BRAKE

[75] Inventors: Rolf Weiler; Erhard Czich, both of Eppstein; Harald Goebel, Herborn-Seelbach, all of Germany

[73] Assignee: Alfred Teves GmbH, Germany

[21] Appl. No.: 910,468

[22] Filed: Jul. 8, 1992

[30] Foreign Application Priority Data

Jul. 9, 1991 [DE] Germany ............... 41 22 672.0

[51] Int. Cl.6 ........................................ F16D 65/09
[52] U.S. Cl. .................... 188/325; 188/216; 188/331; 188/340; 188/341
[58] Field of Search ............... 188/106 F, 106 A, 216, 188/331, 325, 341, 78, 326, 327, 328, 330, 332, 333, 106 R, 79.55, 79.54, 79.51, 340, 218 A, 325–336, 205 A

[56] References Cited

U.S. PATENT DOCUMENTS

| | | |
|---|---|---|
| 1,660,176 | 2/1928 | Rayburn . |
| 1,940,022 | 12/1933 | Schnell ............ 188/106 A |
| 2,161,640 | 6/1939 | Schnell ............ 188/106 A |
| 2,192,001 | 2/1940 | Bolster ............ 188/106 A |
| 2,788,866 | 4/1957 | Porsche et al. ...... 188/79.56 |
| 3,175,644 | 3/1965 | Klein ............. 188/216 X |
| 3,874,481 | 4/1975 | Margetts ......... 188/79.56 |
| 4,869,352 | 9/1989 | Sampson ............ 188/340 |
| 4,887,698 | 12/1989 | Hunt et al. ....... 188/341 X |
| 5,044,475 | 9/1991 | Clark ............ 188/216 X |
| 5,058,713 | 10/1991 | Evans ............ 188/79.54 |
| 5,180,037 | 1/1993 | Evans ............ 188/341 X |

FOREIGN PATENT DOCUMENTS

| | | |
|---|---|---|
| 710643 | 9/1941 | Germany . |
| 1022920 | 1/1958 | Germany ........... 188/106 A |
| 1943694 | 8/1966 | Germany . |
| 1155283 | 6/1969 | Germany . |
| 2024592 | 11/1970 | Germany . |
| 7300934 | 1/1973 | Germany . |
| 389552 | 3/1933 | United Kingdom . |

Primary Examiner—Douglas C. Butler
Attorney, Agent, or Firm—Robert P. Seitter; J. Gordon Lewis

[57] ABSTRACT

In a duo-servo drum brake comprising a mechanical expander adjacent a thrust bearing for supporting the brake shoes, with the expander including an operating lever to which is transmitted the operating force of an actuator substantially in a direction tangential to the edge of the brake drum. The brake shoe is movable through an expander in the direction of the operating force and connected to a thrust bearing through a prestressed spring. The spring force of the prestressed spring opposes the expanding force of the expander and exceeds the operating force required for placing the brake shoes in abutment with the brake drum on the operating lever.

21 Claims, 3 Drawing Sheets

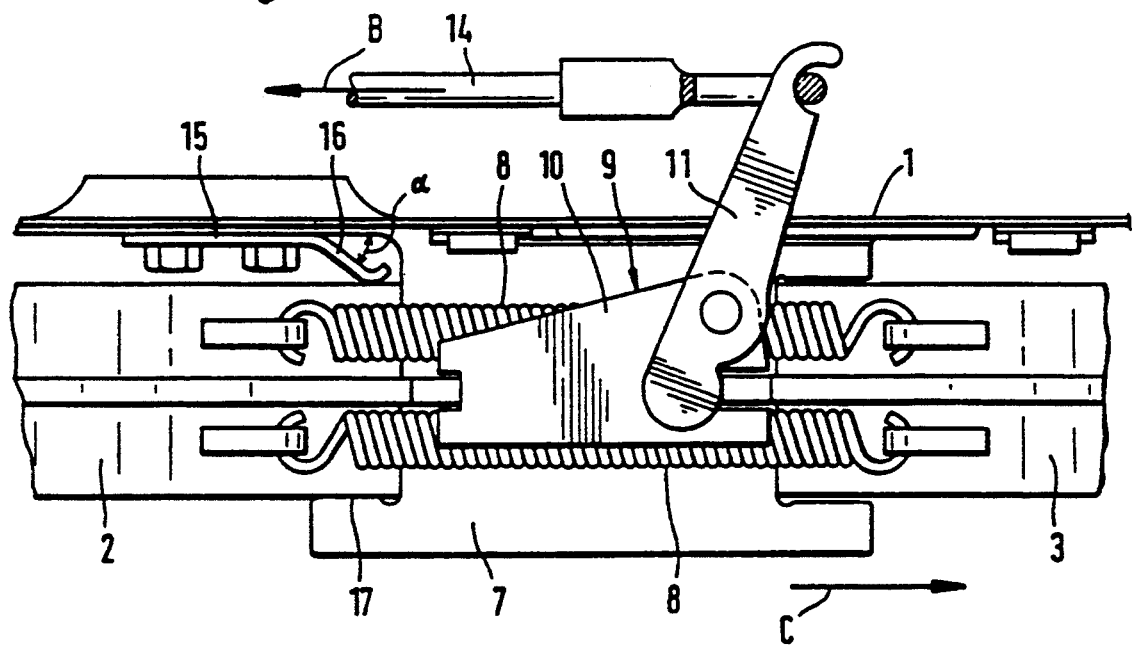
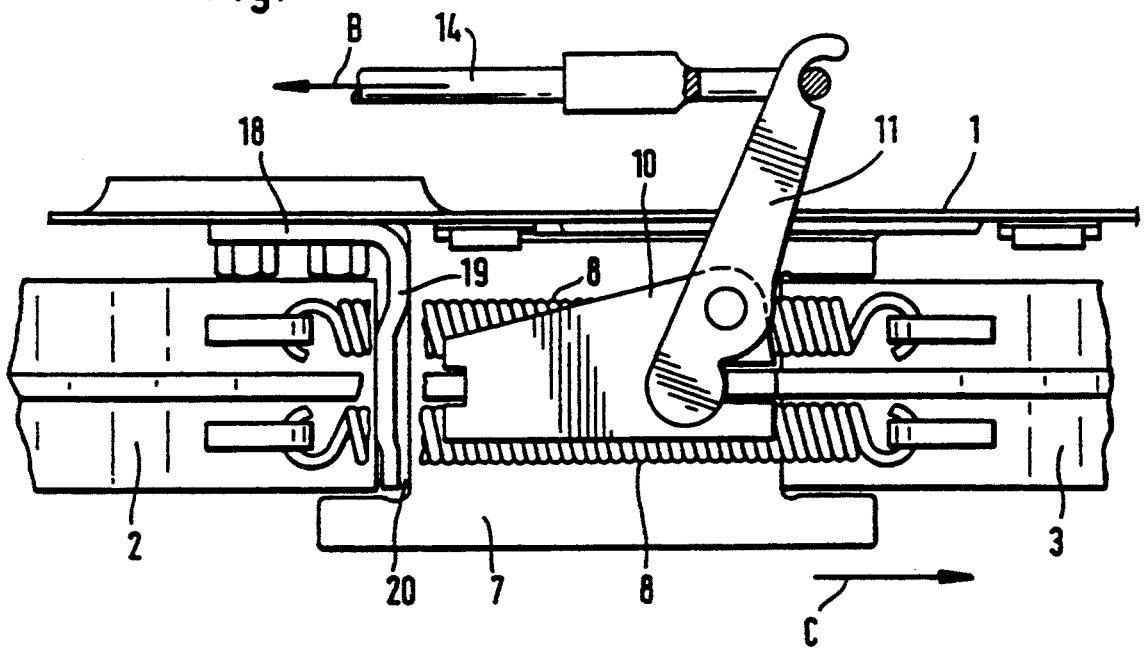

DUO-SERVO DRUM BRAKE

The present invention is concerned with a duo-servo drum brake comprising a thrust bearing for supporting the mechanical expander adjacent the brake shoes, with the expander having an operating lever to which is transferred the actuating force from an actuator in a direction substantially tangential to the edge of the brake dry.

A variety of designs of duo-servo drum brakes are known in the art. They involve the advantage of a high self-energization, thereby attaining a high brake torque with a comparably low actuating force. This is primarily advantageous with mechanical brake actuators. Accordingly, duo-servo brake drums, frequently, are employed as parking brakes in automotive vehicles.

Duo-servo drum brakes of the afore-mentioned type are provided for automotive vehicles in which, in view of given structural conditions, the actuator, e.g. a cable control, to be connected to the operating lever is to be arranged such that the actuating force will act on the operating lever substantially in a direction tangential to the peripheral edge of the brake drum, with the result that, with the brakes applied, the brake shoe connected, in the direction of the actuating force, to the expander—as opposed to the other brake shoe—is actuated not only by the expanding force generated by the expander but also by a force corresponding to the actuating force so that the said brake shoe, in view of the higher overall force acting thereon, is lifted from the thrust bearing while the other brake shoe continues to be supported on the thrust bearing. If the direction of rotation of the brake drum corresponds to the direction of the actuating force, the brake shoes maintain the position to which they were moved upon commencement of the actuating process. However, once the brake drum is moved in the opposite direction, the brake shoes, when in abutment with the brake drum, along with the expander, through the friction, follow the movement of the brake drum until the brake shoe disposed in the direction of the actuating force, strikes against the thrust bearing while the other brake shoe is lifted from the thrust bearing. This striking movement which is more or less violent and correspondingly noisy, depending on the braking operation, is inconvenient and, hence, undesirable. Also, it leads to a jerky increase in the actuating force noted at the manual or pedal lever of the actuator, thereby affecting the operating comfort.

Basic to the invention is the problem of eliminating, in a duo-servo drum brake of the afore-described type, an inconvenient striking of the brake shoe movable through the expander in the direction of the actuating force.

This problem, in the practice of the invention, is solved in that the brake shoe movable through the expander in the direction of the actuating force, is connected to the thrust bearing by a prestressed spring, the spring force of which opposes the expanding force of the expander and is in excess of the actuating force required for placing the brake shoes in abutment with the brake drum on the operating lever.

In the duo-servo drum brake according to the invention, the brake shoe disposed in the direction of the actuating force is urged by the prestressed spring with a force against the thrust bearing such that, in the phase of an actuating process preceding the friction contact of the brake shoe with the brake drum, in which the brake clearance is overcome, it does not follow to lift the brake shoe from the thrust bearing. If the brake shoes then get into engagement with the brake drum, the frictional force transferred thereto, with no additional displacement of the brake shoes and a striking involved therewith, can be transferred to the thrust bearing when the rotating movement of the brake drum opposes the actuating force on the operating lever. The solution according to the invention, in the first place, is, therefore, suitable for such cases of end-use application, where the direction of rotation of the brake drum is the main direction of rotation, i.e., for example, the direction of rotation in forward driving.

According to a preferred form of embodiment of the invention, it is provided that the spring is disposed substantially in parallel with a retractor spring interconnecting the brake shoes, and is hung into the anchor plate connected to the thrust bearing.

For solving the afore-mentioned problem it is, moreover, provided, in the practice of the invention, that the brake shoe movable through the expander in the direction of the actuating force, through a spring, is connected to the thrust bearing, the spring force of which, in the direction of the expanding force of the expander, acts on the brake shoe. In that form of embodiment of the invention, the spring generates a damping effect by delaying the approach of the brake shoe to the thrust bearing when the friction force becomes operative, thereby eliminating the generation of an unpleasant striking noise and a jerky rise in the force on the actuator. Moreover, it is advantageous that, in the initial phase, of a brake applying process, the brake shoe actuable against the direction of the actuating force through the expander, first, remains in abutment with the thrust bearing so that no striking noise can be generated even if the direction of rotation of the brake drum is identical with the direction of the actuating force.

To attain an optimum damping effect, according to another suggestion of the invention, the spring may be prestressed, wherein the prestressing force can also be in excess of the force of the retractor spring assembly operative in parallel to the expander between the brake shoes. According to an advantageous form of embodiment of the invention, the spring is formed as a compression spring and is disposed in a housing fixed to the anchor plate, with the brake shoe comprising a lateral arm in engagement with the compression spring. According to another form of embodiment, the spring is disposed between the thrust bearing and the brake shoe. In that case, the spring may be of a leaf spring-type configuration which is secured, with one leg thereof, to the anchor plate, and with the second leg extends between the thrust bearing and the brake shoe, with the resilient deformability of the second leg being restricted by the thrust bearing. An embodiment of the invention comparable in its effect with this embodiment is also attainable by a compression spring disposed between brake shoe and thrust bearing and held within a recess in the thrust bearing the prestressing force of which is lower than the force of the retractor spring assembly.

According to another suggestion of the invention, for the solution of the afore-described problem, it can also be provided that the brake shoe movable by the expander in the direction of the actuating force, through a friction lock, is connected to the thrust bearing the friction force of which exceeds the actuating force required for placing the brake shoe in abutment with the brake drum. The friction lock, hence, firmly holds, as does the afore-described spring in the initial phase of the actuating process, the brake shoe disposed in the direction of actuation so that the friction force, in case of a rotation of the brake drum, opposing the actuating force, with no displacement of the brake shoe in the peripheral direction, can be directly supported on the thrust bearing. The friction lock, preferably, is formed by a leaf spring fixed to the anchor plate and by a friction surface of the thrust bearing opposite the leaf spring between which is located the brake shoe. The leaf spring, moreover, can be inclined at an angle against the brake shoe to enhance the friction force through self-energization in the direction opposite the actuating force.

The invention will now be described in closer detail with reference to examples of embodiments as shown in the drawing, wherein:

FIG. 3 is a partial view in analogy to FIG. 2 of another form of embodiment of the invention, comprising a friction lock, and FIG. 4 is a partial view similar to FIG. 2, of a further embodiment of the invention, comprising a damping spring operative between brake shoe and thrust bearing.

Figure 1:
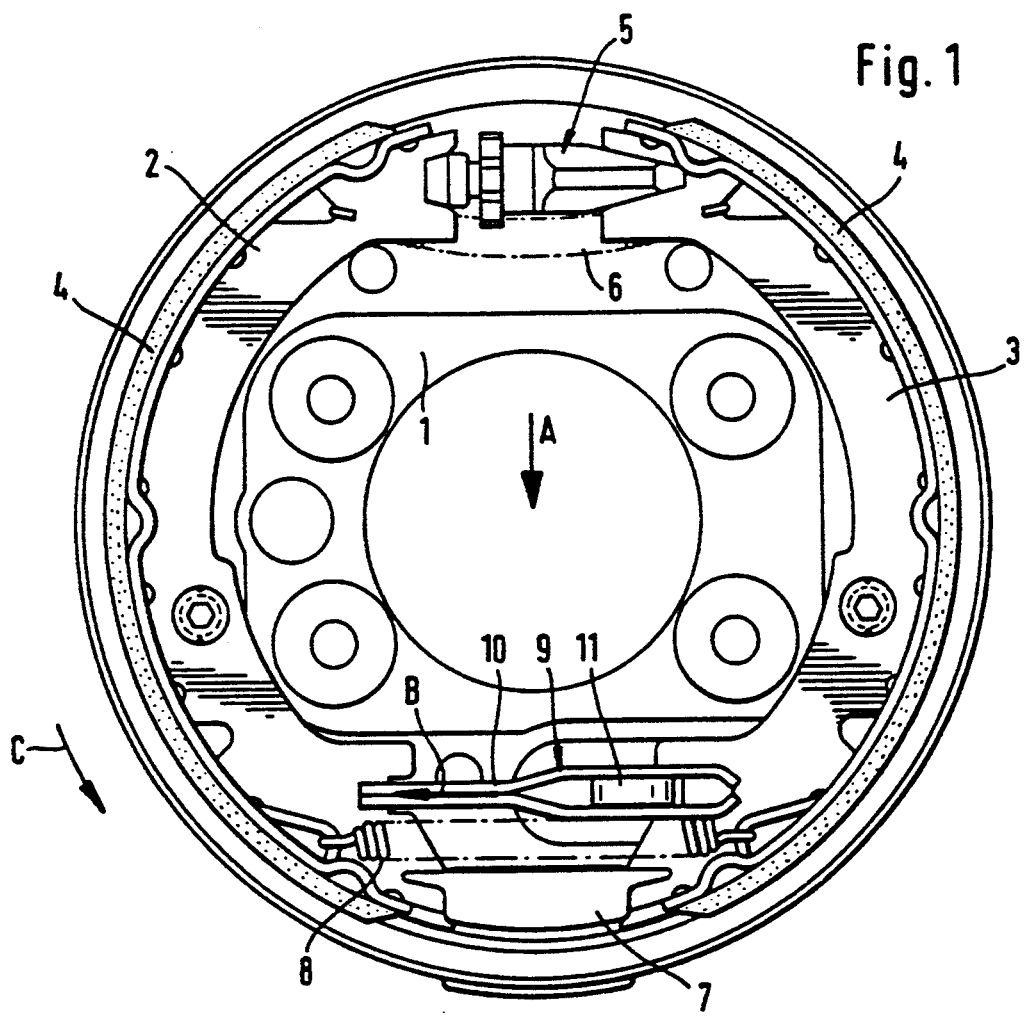
FIG. 1 is a view of the duo-servo drum brake after removal of the brake drum.

FIG. 1 shows the basic design of a mechanically actuable duo-servo drum brake. Displaceably disposed on an anchor plate 1 connected to a non-rotating part of the wheel suspension of an automotive vehicle, are two brake shoes 2, 3. The cylindrical outer faces of the brake shoes 2, 3 are formed by friction pads 4 which are secured to the brake shoes 2, 3 by being forced thereon or cemented thereto. Provided between the ends of the brake shoes 2, 3 which, in the drawing, are disposed on top, is a longitudinally displaceable screw shackle 5 freely suspending between the ends of the brake shoes and being held in position through the force of a tension spring 6 connecting the ends of the brake shoes 2, 3. The brake shoes 2, 3, through the screw shackle 5, are supported on one another. Located between the bottom ends of the brake shoes 2, 3 is a thrust bearing 7 firmly connected to the anchor plate 1 and serving for supporting the friction force acting, with the brake applied, on the brake shoes. Disposed in parallel with the thrust bearing 7 is a retractor spring 8 connected to the ends of the brake shoes 2, 3 forcing the same against the thrust bearing 7. In side-by-side relationship with the retractor spring 8 is an expander 9 composed of a pressure tongue 10 and a two-arm operating lever 11 pivotally connected to the former and swivably disposed on the pressure tongue 10. The operating lever 11, with the shorter lever arm thereof, is supported on the brake shoe 3. The longer lever arm of the operating lever 11 projects through a hole in the anchor plate out of the drum brake and is connected therein to a mechanical actuator.

For actuating the duo-servo drum brake, the ends of the brake shoes 2, 3 adjacent the expander 9 are forced apart, with the actuating force B supported on the pressure tongue 10 and actuating the operating lever 11 causing the brake shoe 2 to be lifted from the thrust bearing 7 while the brake shoe 3 remains supported on the thrust bearing 7. If the brake drum now rotates in counter clockwise direction toward the arrow C, the friction force acting on the brake shoes 2, 3 when placed in abutment with the brake drum, only through the brake shoe 2 can be supported on the thrust bearing 7. The brake shoe 2, hence, is restored to its position as shown in the drawing, thereby striking against the thrust bearing 7. At the same time, the brake shoe 3, is lifted from the thrust bearing 7 as it is supported, through the screw shackle 5, on the brake shoe 2, hence, following the movement of the brake shoe 2.

Figure 2:
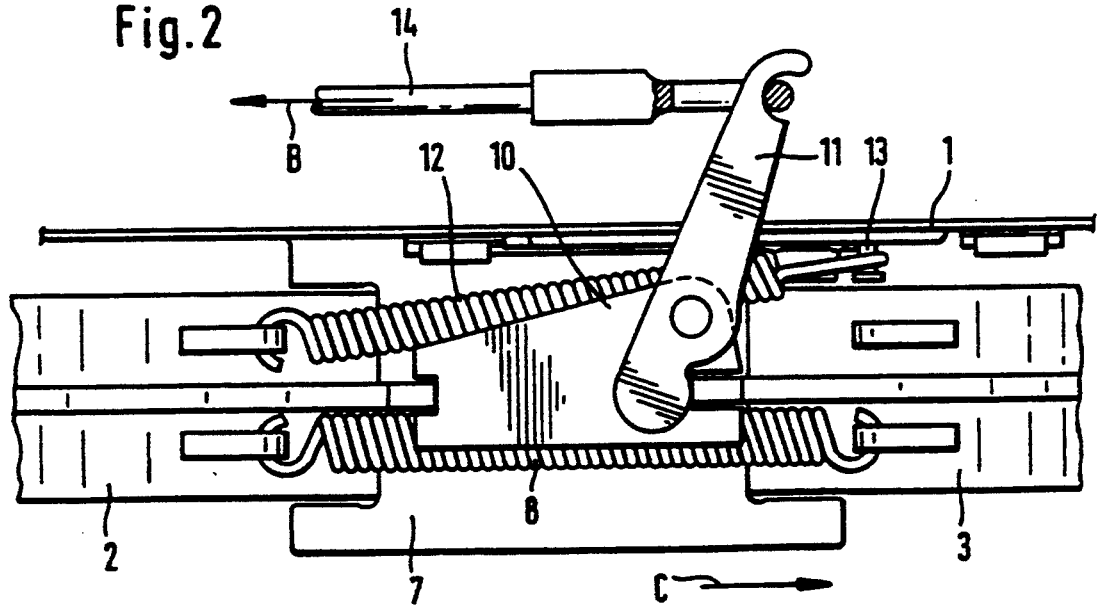
FIG. 2 is a partial view in the direction of arrow A according to FIG. 1, of an embodiment of a duo-servo drum brake according to the invention comprising a tension spring disposed between a brake shoe and the thrust bearing.

FIG. 2 shows an embodiment of the duo-servo drum brake according to FIG. 1 wherein lifting thereof and, consequently, a striking of the brake shoe 2 involved therewith are avoided. For that purpose, a tension spring 12 is provided which is hung with one end thereof on the brake shoe 2 and with the other end thereof on a bolt 13 rigidly connected to the anchor plate 1. The tension force of the tension spring 12 is larger dimensioned than the actuating force B which on the cable 14 connected to the operating lever 11, is required to overcome the force of the retractor spring 8 and to cause the brake shoes 2, 3 to get into abutment with the brake drum, so that, with the brake applied, the actuating force B transferred through the pressure tongue to the brake shoe 2 and generated in addition to the expanding force by the expander 9 is taken up by the tension spring 12 such that the brake shoe 2 is held on the thrust bearing 7 to lift in place the brake shoe 3 from the thrust bearing 7. Once the brake shoes 2, 3 get into engagement with the brake drum the direction of rotation of which is indicated by arrow C, the friction force acting on the brake shoes 2, 3 is transferred from the brake shoe 2 through the play-free abutment, to the thrust bearing 7, preventing a striking from occurring.

In the example of embodiment as shown in FIG. 3, the brake shoe 2 is equally prevented from being lifted from the thrust bearing 7 when the brake is applied. For this purpose, a leaf spring 15 is fixed to the anchor plate 1 which, with one spring leg 16 inclined at an angle, is forced against a lateral edge of the brake shoe 2. Disposed on the side opposite the leaf spring 15, on the thrust bearing 7, is a friction face 17 with which the brake shoe 2 is in abutment under the action of the leaf spring 15. The leaf spring 15 and the friction face 17 form a friction lock the friction force of which is adequate to take up the actuating force B. The angle of incidence of the spring leg 16 additionally generates a self-energization of the friction force operating in the direction of the actuating force B so that the prestressing force of the leaf spring 15 can be held correspondingly lower, thereby facilitating the assembly of the brake shoes. In that form of embodiment, the brake shoes 2, 3 are interconnected by retractor springs 8.

In the example of embodiment as shown in FIG. 4, a leaf spring 18 is fixed to the anchor plate 1 by nuts, which spring comprises a spring arm 19 bent at right angles to the plane of the anchor plate 1 and being disposed in an interval between the thrust bearing 7 and the brake shoe 2. The end of the spring arm 19 adjacent the anchor plate 1 is in abutment with the thrust bearing 7 while a clearance 20 is provided between the other end of the spring arm 19 and the thrust bearing 7, which is present with the brake released once the brake shoe 2 is forced solely under the effect of the retractor springs 8 against the spring arm 19.

If the brake as shown in FIG. 4 is applied, the brake shoe 2 is removing from the thrust bearing 7 under the effect of the actuating force B, while the brake shoe 3 remains supported on the thrust bearing 7. The spring arm 19, on account of the prestressing force caused by the retractor springs 8 follows the said movement in whole or in part. If the brake shoes 2, 3 now get into engagement with the brake drum rotating in the direction of the arrow C, the brake shoe 3 is lifted from the thrust bearing 7 while the brake shoe 2 is forced against the spring arm 19 and the thrust bearing 7. Owing to its spring force, the spring arm 19 flexibly absorbs the said movement, thereby avoiding a noisy striking against the thrust bearing 2. With a rising friction force, the spring arm 19 deforms to such an extent that the clearance 20 is used up, so that it is also with the free end thereof supported on the thrust bearing 7.

Figure 5:
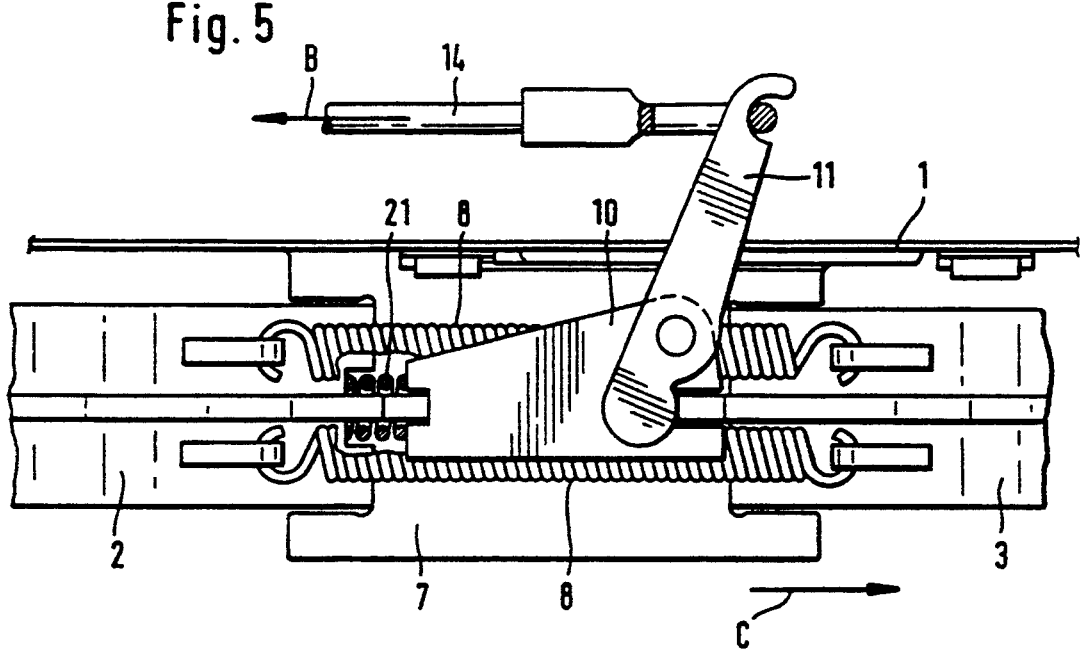
FIG. 5 is a partial view similar to FIG. 2, of a further embodiment of the invention, comprising a damping spring operative between brake shoe and thrust bearing.

FIG. 5 shows an embodiment of a duo-servo drum brake including a stop damping for the brake shoe 2. Disposed in adjacent recesses, within the thrust bearing 7 and in the brake shoe 2 is a prestressed helical compression spring 21 which, in the axial direction, is supported on the brake shoe 2 and on the thrust bearing 7. The prestressing force of the helical compression spring is slightly lower than the spring force of the retractor springs 8 so that the brake shoe 2, in the brake releasing position, is in abutment with the thrust bearing 7. When applying the brake, the brake shoe 2 is first lifted from the thrust bearing 7 and is then, after being placed in abutment with the brake drum, returned, through the growing friction force to the thrust bearing. Thanks to the prestressing force of the helical compression spring 21, the striking of the brake shoe 2 against the thrust bearing 7 is damped.

Figure 6:
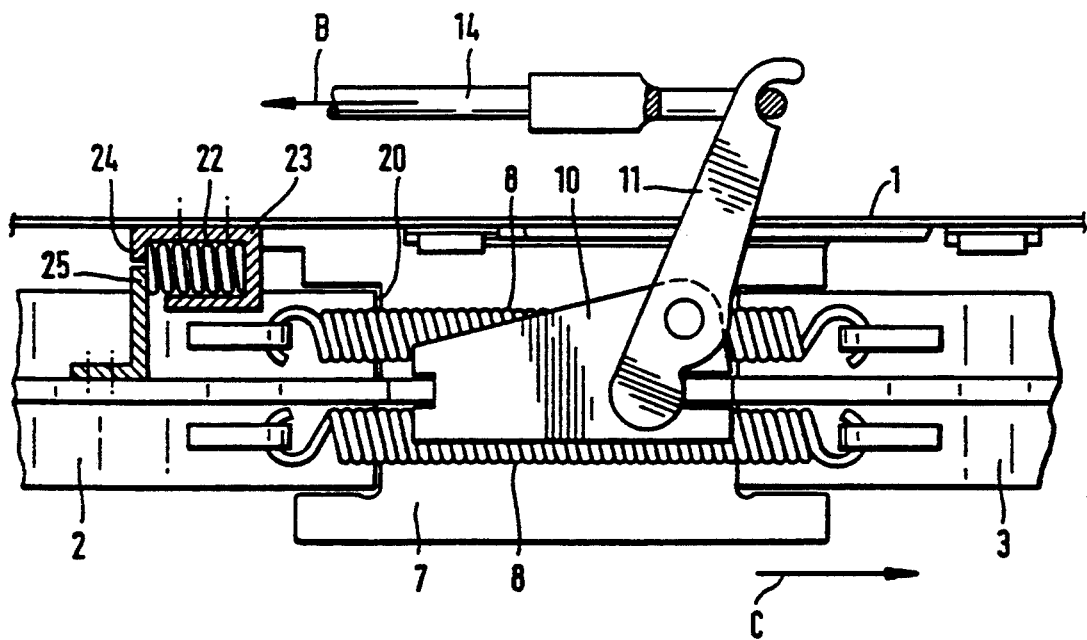
FIG. 6 is a partial view similar to FIG. 2, of a further embodiment of the invention, comprising a damping spring operative between brake shoe and thrust bearing.

In the form of embodiment as shown in FIG. 6, a helical compression spring 22 is provided for damping the striking of the brake shoe 2, which spring is disposed in a spring housing 23 fixed to the anchor plate 1. The spring housing 23 comprises a stop 24 limiting the extension of the helical compression spring 22 to a predetermined amount, thereby enabling the preloading force of the helical compression spring 22 to be larger dimensioned than the force of the two retractor springs 8 hunt into the brake shoes 2, 3. Fixed to the stem of the brake shoe 2 is an angular support 25 which with the free end thereof is in abutment with the side of the helical compression spring 22 facing away from the thrust bearing 7. In the brake releasing position as shown, a clearance 20 is provided between the thrust bearing 7 and the brake shoe 2. The brake shoe 3 is in abutment with the thrust bearing 7.

The way of operation of this form of embodiment substantially corresponds to the one of the example of embodiment according to FIG. 4. If, when applying the brake, the brake shoe 2 displaced in the direction of the actuating force B, in a rotation of the brake drum in the direction of arrow C, through the friction force, is moved back to the thrust bearing 7, the angular support 25 first will get into engagement with the helical compression spring 22, thereby taking up a part of the friction force and delaying and, hence, damping the approach of the brake shoe 2 to the thrust bearing 7. In the brake position, no clearance 20 any longer exists and the brake shoe 2 is directly in abutment with the thrust bearing 7 so that high braking forces can be transferred.

We claim:

1. A duo-servo drum brake comprising, a brake drum, a mechanical expander adjacent a thrust bearing for supporting brake shoes, the expander including an operating lever to which an operating force is transferred from an actuator substantially in a direction tangential to an edge of the brake drum, at least one of said brake shoes being movable in response to the expander in the direction of the operating force, said one of said brake shoes being biased with respect to the thrust bearing by a prestressed spring, a spring force of which opposes an expanding force of the expander and exceeds the operating force on the operating lever required for placing the brake shoes in abutment with the brake drum, and a retractor spring interconnecting the brake shoes disposed substantially in parallel to said prestressed spring.

2. A duo-servo drum brake according to claim 1, wherein the prestressed spring is mounted at one end upon an anchor plate connected to the thrust bearing.

3. A duo-servo drum brake comprising a brake drum and a mechanical expander and thrust bearing assembly for supporting a pair of brake shoes, the expander having an operating lever to which an operating force is transferred from an actuator substantially in a direction tangential to an edge of the brake drum, at least one of said brake shoes being movable in response to the expander in the direction of the actuating force, said one of said brake shoes being biased with respect to a thrust bearing by a first spring, an end of said first spring being mounted at one end upon a fixed member, a spring force of which, in the direction of the expanding force of the expander, acts upon said one of said brake shoes, and a retractor spring interconnecting the brake shoes disposed substantially in parallel to said first spring.

4. A duo-servo drum brake according to claim 3 wherein the brake shoe is movable by the expander in the direction of the operating force through a friction lock, the friction force of which exceeds the actuating force required for placing the brake shoe in abutment with the brake drum.

5. A duo-servo drum brake according to claim 4, wherein the friction lock is formed by a leaf spring fixed to the anchor plate and by a friction face on the thrust bearing opposite the leaf spring, the brake shoe being positioned between the leaf spring and the friction face.

6. A duo-servo drum brake according to claim 5, wherein the leaf spring is inclined at an angle against the brake shoe.

7. A duo-servo drum brake according to claim 6, characterized in that said first spring is prestressed.

8. A duo-servo drum brake according to claim 7, wherein the spring is in the form of a compression spring and is disposed in a housing fixed to the anchor plate, with the brake shoe including a lateral arm engaging the compression spring.

9. A duo-servo drum brake according to claim 7, wherein the spring is provided between the thrust bearing and the brake shoe.

10. A duo-servo drum brake according to claim 9, wherein the spring is in the form of a leaf spring fixed with one leg thereof engaging the anchor plate and with the second leg thereof extending between the thrust bearing and the brake shoe, with the resilient deformability of the second leg being limited by the thrust bearing.

11. A duo-servo drum brake according to claim 9, wherein the compression spring is held in a recess in the thrust bearing and the prestressing force thereof is lower than the force of the retractor spring assembly.

12. A duo-servo brake as recited in claim 6, wherein said fixed member is an anchor plate.

13. A duo-servo brake as recited in claim 6, wherein said fixed member is said thrust bearing.

14. A duo-servo drum brake having a pair of brake shoes which at one end are biased together by retractor springs and separated by an expander and thrust bearing, said brake shoes being adapted to be forced outwardly against the bias of said retractor springs with respect to said thrust bearing against a brake drum in response to an actuating force applied to said expander, comprising a prestressed spring disposed substantially in parallel with said retractor springs between one of said brake shoes and a fixed member for restricting movement of said one of said brake shoes with respect to said thrust plate to prevent said one brake shoe from striking said thrust bearing.

15. The duo-servo drum brake of claim 14, wherein said prestressed spring restricts movement of said one of said brake shoes with respect to said other brake shoe in response to movement of said expander.

16. The duo-servo drum brake of claim 14, wherein said prestressed spring has a spring force slightly less than the spring force of said retractor springs such that any striking of said one brake shoe against said thrust bearing is dampened.

17. A duo-servo drum brake comprising a brake drum and a mechanical expander and thrust bearing assembly for supporting a pair of brake shoes, the expander having an operating lever to which an operating force is transferred from an actuator substantially in a direction tangential to an edge of the brake drum, at least one of said brake shoes being movable in response to the expander in the direction of the actuating force, said one of said brake shoes being connected to a thrust bearing by a prestressed spring, a spring force of which, in the direction of the expanding force of the expander, acts upon said one of said brake shoes, wherein the prestressing force of the spring is greater than the force of a retractor spring assembly operative in parallel to the expander between the brake shoes.

18. A duo-servo drum brake having a pair of brake shoes which at one end are biased together by retractor springs and separated by an expander and thrust bearing, said brake shoes being adapted to be forced outwardly against the bias of said retractor springs with respect to said thrust bearing against a brake drum in response to an activating force applied to said expander, comprising a restricting means for restricting movement of one of said brake shoes with respect to said thrust plate to prevent said one brake shoe from striking said thrust bearing, wherein said restricting means includes a biasing means disposed between said one brake shoe and said thrust bearing.

19. The duo-servo drum brake of claim 18, wherein said biasing means includes a prestressed spring fixedly mounted to a fixed member, and an engaging arm protruding from said one brake shoe adjacent said prestressed spring and adapted to engage said prestressed spring as said one brake shoe approaches said thrust bearing.

20. The duo-servo drum brake of claim 18, wherein said biasing means is a leaf spring mounted to a fixed member and extending between said thrust bearing and said one brake shoe.

21. The duo-servo drum brake of claim 18, wherein said restricting means includes a leaf spring fixed to a fixed member and a friction face on said thrust bearing, said leaf spring and friction face being on opposed sides of said one brake shoe such that said one brake shoe is engaged along its sides to frictionally restrict movement of said one brake shoe, said frictional force being greater than said actuating force.

* * * * *